United States Patent [19]

Dahlquist

[11] Patent Number: 4,904,392

[45] Date of Patent: Feb. 27, 1990

[54] METHOD OF SEPARATING, FROM A LIQUID MIXTURE, A LIQUID IN DISPERSED PHASE FROM A LIQUID IN CONTINUOUS PHASE

[75] Inventor: Erik Dahlquist, Västerås, Sweden

[73] Assignee: ABB Atom AB, Västerås, Sweden

[21] Appl. No.: 333,553

[22] Filed: Apr. 5, 1989

[30] Foreign Application Priority Data

Apr. 8, 1988 [SE] Sweden ............................. 8801288

[51] Int. Cl.$^4$ .............................................. B01D 35/00
[52] U.S. Cl. ..................................... 210/708; 210/767; 210/332; 210/396; 210/408; 210/413; 210/DIG. 5
[58] Field of Search ............... 210/767, 780, 789, 800, 210/405, 391, 396, 397, 332, 407, 408, 413, 414, 415, 702, 708, 221.2

[56] References Cited

U.S. PATENT DOCUMENTS 4,534,862  8/1985  Zlokarnik ........................ 210/221.2

Primary Examiner—Frank Sever

Attorney, Agent, or Firm—Watson, Cole, Grindle & Watson

[57] ABSTRACT

From a liquid mixture containing a liquid in a continuous phase and a liquid in the form of drops in a phase dispersed therein, the liquid in the dispersed phase is separated from the liquid in the continuous phase by passing the liquid mixture through a liquid-permeable layer (11, 12), arranged in chamber (10), with throughholes of which at least the majority has a cross section area which is greater than the cross section area of at least the main part of the drops in the dispersed phase, the liquid mixture being sheared, by means of a rotor (23) arranged in the chamber on the inlet side of the liquid-permeable layer, over the layer while maintaining a film (24) of liquid, movable along the layer, from the dispersed phase on the layer and while maintaining a higher pressure on the inlet side of the layer than on its outlet side. Drops of dispersed liquid then coalesce in the film and in the through-holes of the layer and can thus be separated from the liquid in the continuous phase.

7 Claims, 1 Drawing Sheet

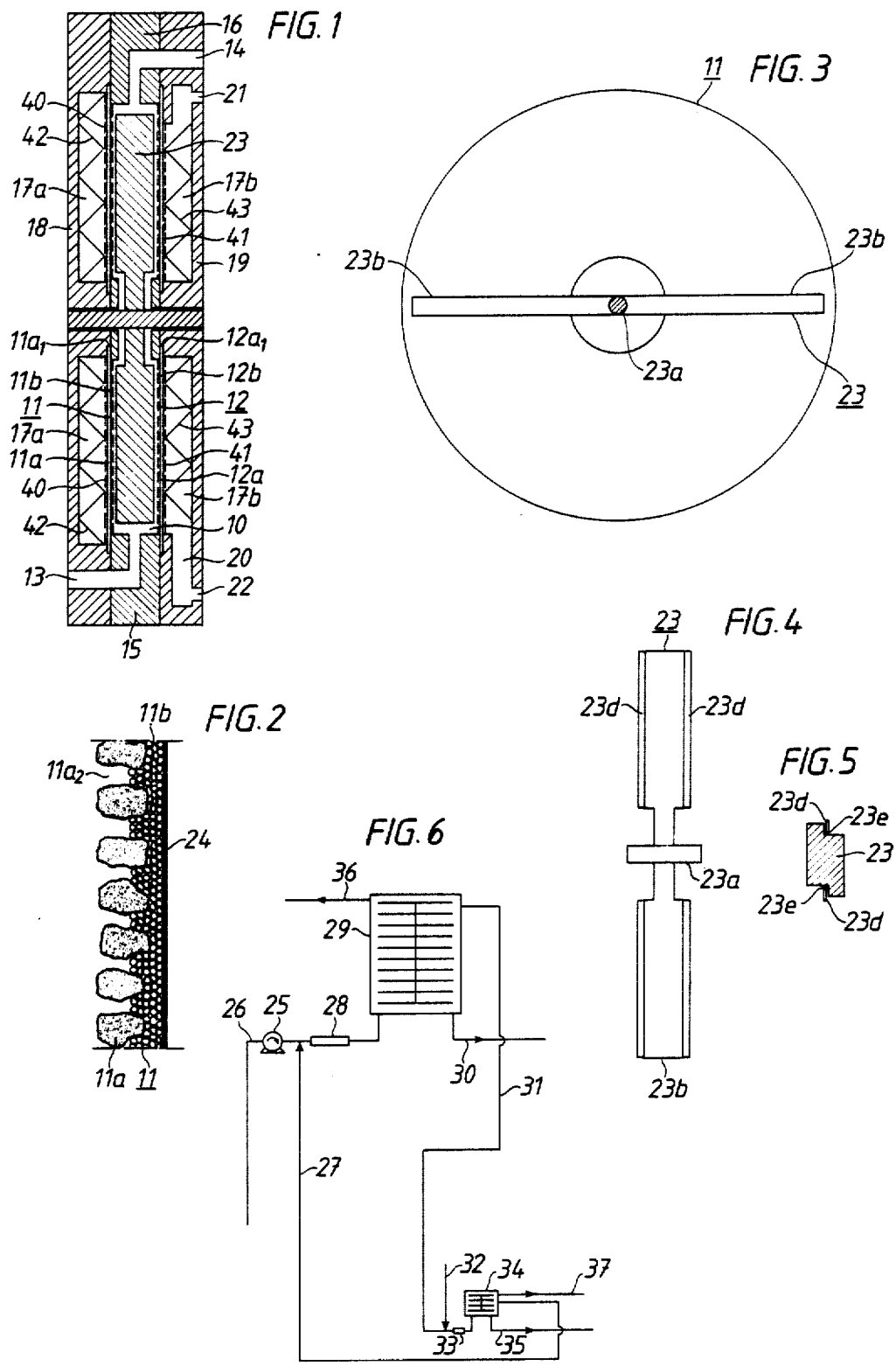

METHOD OF SEPARATING, FROM A LIQUID MIXTURE, A LIQUID IN DISPERSED PHASE FROM A LIQUID IN CONTINUOUS PHASE

The present invention relates to a method of separating, from a liquid mixture containing a liquid in a continuous phase and a liquid in the form of drops of a phase dispersed therein, the liquid in the dispersed phase from the liquid in the continuous phase.

The invention is related to the separation of different kinds of liquids which are dispersed in another liquid, such as mineral oil or a vegetable oil dispersed in water, water dispersed in oil, an organic solvent, for example xylene, dispersed in water, an organic fuel, for example paraffin dispersed in water, and so on. Separation processes of this kind are used, inter alia, in the treatment of oil-containing water from oil refineries or oil platforms, in solvent recovery, and in connection with extraction processes.

The equipment that is used to separate liquids which are insoluble in one another from one another may, inter alia, consist of sand beds, filter beds, and coalescence filters in the form of thick, compressed filter mats. These beds have a poor cleaning effect, especially as regards dispersed small drops. The filter mats are rapidly clogged by solid particles and waxes. Common to these separation devices is that the regeneration thereof is complicated.

The present invention relates to a particularly efficient method of separating a liquid in dispersed phase and a liquid in continuous phase in a liquid mixture thereof. The method according to the invention enables the use of equipment which is particularly easy to regenerate.

According to the invention, the liquid mixture is passed through a liquid-permeable layer, arranged in a chamber, with through-holes of which at least the majority has a cross section area which is larger than the cross section area of at least the main part of the drops of the liquid in the dispersed phase, the liquid mixture being sheared, by means of a rotor arranged in the chamber on the inlet side of the liquid-permeable layer, over the layer and while maintaining a higher pressure on the inlet side of the layer than on the outlet side thereof, drops of the liquid in the dispersed phase coalescing in the film, and while passing through the through-holes in the layer. After passage of the liquid-permeable layer, the coalesced liquid is separated from the liquid in the continuous phase. The liquids are suitably discharged from the chamber through separate outlets.

The rotation of the rotor gives rise to the formation of a thin film of liquid from the dispersed phase along the layer. This film covers substantially the surface of the entire layer and is moved along the layer as a result of the rotation of the rotor. When parts of the layer arrive above the orifice of the through-holes in the layer, they are pressed through the holes because of the pressure difference on the two sides of the layer. Coalescence occurs partly by drops of dispersed liquid being "rubbed" against the liquid film in connection with the shearing of the liquid mixture, partly by increased contact between drops and film upon passage thereof through the holes. Because the liquid film temporarily and partially covers the orifices of the holes, the cross section area of the holes will be smaller than the nominal area, which increases the probability of small oil drops coalescing in the layer. If no rotor is used, the liquid mixture passes unchanged through the liquid-permeable layer.

The liquid-permeable layer with through-holes may consist of one single element in the form of a woven or felted product having through-holes, for example a net or a mat built up of fibres of a polymer material such as polypropylene, polyethyleneglycol terephthalate, polyamide, polysulphon, or polyurethane, or fibres of a metallic material such as stainless steel. The layer may, inter alia, also have the form of a sintered porous (through-pores) or perforated homogeneous plate of metal such as stainless steel or of a ceramic material such as aluminum oxide. The through-holes in such a layer suitably have a cross section area of $0.01 \cdot 10^{-3} - 10 \cdot 10^{-3}$ mm$^2$.

The liquid-permeable layer may also consist of an element of the described kind as supporting element and a layer of a small-sized particulate material, dynamically applied on the above-mentioned element, for example consisting of silicon dioxide, diatomaceous earth, zirconium dioxide, aluminium oxide, titanium dioxide, glass, or a polymer material. In a layer composed in this manner the through-holes have the same cross section area as when using a layer consisting of one single element, i.e. suitably a cross section are of $0.01 \cdot 10^{-3} - 10 \cdot 10^{-3}$ mm$^2$. To achieve such a cross section area of the composite layer, the through-holes in the supporting element suitably have a cross section area of $1 \cdot 10^{-3} - 300 \cdot 10^{-3}$ mm$^2$ and the particulate material suitably a mean particle size of 5–300 $\mu$m. The particulate material is suitably applied on the supporting element from a suspension supplied to the chamber of the separation device while maintaining a pressure difference between the two sides of the supporting element. In certain cases it may be suitable to construct the liquid-permeable layer of a supporting element and several particulate layers arranged one above the other, a particulate layer located nearer to the supporting element then having a greater particle size than a particulate layer located further from the supporting element. A composite liquid-permeable layer constructed in the above-mentioned manner has through-holes with the same cross section as stated above for a layer consisting of one single element.

The choice of size for the holes in the liquid-permeable layer is dependent on the size of the drops of the dispersed liquid. If the drops are small, the cross section area of the holes is in the lower part of the stated interval, and if the drops are large they are in the upper part of the interval.

In carrying out the method according to the invention, the flux which is maintained through the liquid-permeable layer is dependent on the liquid treated, but generally the flux is in the interval 1–50 m$^3$/m$^2$h. The liquids on the outlet side of the liquid-permeable layer are suitably directed to move along the layer. The velocity of flow is then preferably maintained at at most 2 m/sec.

The rotor is suitably provided with an axis of rotation perpendicular to the liquid-permeable layer and is formed with parts, for example wings, which are movable along the surface of the layer and brings about the shearing of the liquid mixture over the layer. The rotor is preferably also utilized for regeneration of the layer, coatings and possibly parts of the liquid-permeable layer then being removed and these parts replaced by new material. In order to bring the parts which are active during the regeneration, such as scrapers on the rotor, into mechanical contact with the liquid-permeable layer, the rotor can be made displaceable relative to the layer in the direction of the axis of rotation. Alternatively, the rotor can be provided with movable scrapers adapted to be brought into mechanical contact with the liquid-permeable layer when the rotor rotates in one direction of rotation, whereas when the rotor rotates in the opposite direction of rotation they are blocked from contact with the layer.

According to one embodiment, the method according to the invention is used to carry out extractions, whereby the liquid in the dispersed phase consists of an extraction agent for extraction of one or more substances from the liquid in the continuous phase. The liquid in the dispersed phase with substances taken up from the liquid in the continuous phase is then separated, after passage of the liquid-permeable layer, in coalesced state from the liquid in the continuous phase.

The invention will be explained in greater detail, by way of examples, with reference to the accompanying drawing, wherein FIG. 1 shows a separation device for carrying out the method according to the invention in a section, perpendicular to the liquid-permeable layer, through the axis of the rotor, FIG. 2 shows a small part of a liquid-permeable layer on a greatly enlarged scale, FIG. 3 shows the liquid-permeable layer and the rotor seen in the direction of the rotor axis from the interior of the separation device, FIG. 4 shows an embodiment of the rotor in the same section as in FIG. 1, FIG. 5 shows an embodiment of the rotor in a section perpendicular thereto, and FIG. 6 shows a device for utilizing the method according to the invention for extraction.

The separation device according to FIG. 1 comprises a chamber 10 of cylindrical shape and two circular liquid-permeable layers 11 and 12 arranged at the end surfaces of the chamber 10. The edges of the layers 11, 12 are sealingly attached to the walls of the chamber 10 by seals (not shown). Each liquid-permeable layer 11, 12 comprises a supporting element 11a and 12a, respectively, of a fine-meshed fabric having a central round recess $11a_1$ and $12a_1$, respectively, and of layers 11b and 12b, respectively, of small-sized particle material of the kind illustrated in FIG. 2. At one point on the envelope surface, the chamber 10 is provided with an inlet 13 for the liquid mixture that is to be treated in the separation device, and at a diametrically opposite point on the envelope surface, the chamber 10 is provided with a sealable outlet 14 for discharge of the liquid during regeneration. The outlet 14 can also be used to allow part of the liquid mixture to pass past the layers 11 and 12 while separation is in progress. The inlet 13 and the outlet 14 are arranged in the side walls 15 and 16 of the chamber 10. The liquid mixture that passes through the layers 11 and 12 passes out into spaces 17a and 17b between the layers 11 and 12, respectively, and the end walls 18 and 19, respectively, of the chamber 10. By means of a connection, not shown (at a plane different from that shown in FIG. 1), the upper part of the space 17a is arranged to communicate with the upper part of the space 17b, and in similar manner the lower part of the space 17a is arranged to communicate with the lower part of the space 17b. The space 17b (and hence the space 17a) is provided with an outlet 21 for the lighter liquid in the liquid mixture and with an outlet 22 for the heavier liquid. Alternatively, the space 17a may have outlets of its own corresponding to the outlets 21 and 22 of the space 17b. The layers 11 and 12 are supported by loose supporting net 40 and 41, respectively, with corrugated supporting plates 42 and 43, respectively, against the ends walls 18 and 19.

As shown in FIG. 3, the chamber 10 comprises a rotor 23, in the exemplified case comprising an axis of rotation 23a, the centre line of which coincides with the symmetry axis of the cylindrical chamber 10, and two wings or blades 23b. The rotor shaft is journalled in the walls of the chamber 10 by means of sealing bearings (not shown).

When the separation device is in operation, the liquid mixture that is to be subjected to separation is less via the inlet 13 continuously into the chamber 10 of the separation device whereas the outlet 14 is normally closed. The liquid mixture may consist of water containing oil droplets, such as oil-containing water from oil refineries or oil platforms or waste water from cutting processes. When the rotor 23 rotates, a film 24 (FIG. 2) of oil is formed on the layers 11 and 12. Oil drops in the liquid mixture outside these layers 11, 12 coalesce in the film 24, which is moved by the shearing forces exerted on it during the rotation. When the liquid mixture is pressed through the layers 11 and 12 because of the pressure difference on both sides of these layers, the oil film 24 successively accompanies the liquid mixture through the layers 11, 12. On passing through the through-holes of the layers 11, 12, additional coalescing is achieved. When, after having passed through the layers 11, 12, the liquids reach the spaces 17a and 17b, the lighter phase, in this case oil, can be discharged with the outlet 21 in the upper part of the spaces 17a and 17b, and the heavier phase, in this case water, can be discharged via the outlet 22 in the lower part of the spaces 17a and 17b. The pressure difference that is maintained during the process described may, for example, amount to 0.03–1 MPa.

In the exemplified case the supporting element 11a and 12a, respectively, in the liquid-permeable layers 11 and 12, respectively, consists of a fabric of polypropylene with a mesh width of 50 $\mu$m. The meshes are designated $11a_2$ in FIG. 2. The fabric has a thickness of 300 $\mu$m. The particles in the layers 11b and 12b, respectively, consist of diatomaceous earth having a particle size of around 20 $\mu$m. The thickness of the layers 11b and 12b, respectively, is about 400 $\mu$m. The layers 11b and 12b are applied by sucking up an aqueous suspension of diatomaceous earth through the polypropylene fabric. The majority of the through-holes in the liquid-permeable, composite layers 11 and 12 has a size of about 9 $\mu$m and the majority of the oil drops in the liquid mixture a size of about 5 $\mu$m.

The rotor 23 can be used to regenerate the layers 11 and 12. In accordance with FIGS. 4 and 5, it is preferably provided with scrapers 23d for removal of undesirable coatings, formed on the layers 11 and 12, and of particle material 11b, if such is used, and need to be replaced. The scrapers may be of rubber and have the shape of blades or flaps. they may be attached to the rotor via joints 23e in such a way that they fold out when the rotor 23 rotates in one direction (during regeneration) but fold in when the rotor 23 rotates in the opposite direction (during separation of the liquid mixture). During regeneration water or other liquid is admitted at either of the inlets and outlets 13 and 14 and discharged through the other of the inlets and outlets while at the same time the rotor 23 is rotated with folded-out flaps.

FIGS. 1-5 illustrate a separation device with one chamber only. Normally, it is suitable to use a package of several such devices stacked next to each other with the inlets 13 connected to a common main conduit, the outlets 14 connected to a common main conduit and each of the outlets 21 and 22 similarly connected to a common main conduit. Such a separation device comprising several units stacked one above the other is disclosed in Swedish patent application 8704422-8.

FIG. 6 illustrates the use of the method according to the invention for the extraction of toxic substances dissolved in a liquid, for example waste water from a process industry, in another liquid (extraction agent) insoluble in water having a lower specific weight than water. The dissolved substances need to be removed before the waste water is passed to a recipient. It may, for example, be a question of a bleaching process for paper pulp in which the paper pulp is bleached with chlorine or another chlorine-containing bleaching agent, for example a mixture of chlorine and chlorine dioxide in an acid solution (pH 1-2). A suitable extraction agent in this connection is an organic phosphoric acid ester, for example tributyl* phosphate. In accordance with FIG. 6, the contaminated water is pumped by a pump 25 in a conduit 26, after the supply of extraction agent, from a conduit 27 to a mixer 28 arranged in the conduit 26. The liquid mixture of the extraction dispersed in water, then obtained, is led to a separation device 29 comprising a plurality of separation units of the kind shown in FIGS. 1-5. The water is thus separated from the extraction agent in coalesced state and is discharged via the conduit 30 which is connected to the outlets 22 on the individual separation units in the package to a recipient. In an analogous manner, the coalesced extraction agent is discharged via the conduit 31, which is connected to the outlets 21 on the individual separation units, to a regeneration unit for the extraction agent. The extraction agent is then supplied with a cleaning liquid, for example a 5 per cent caustic soda solution, via the conduit 32, which is dispersed in the extraction agent in a mixer 33. This liquid has the ability to dissolve out the impurities in the extraction agent. The liquid mixture obtained in the mixer 33 is subjected to a separation in the separation device 34 which is of the same kind as, but smaller than, the device 29. The extraction agent thus regenerated is discharged via the conduit 27 and is reused. The cleaning liquid is discharged via the conduit 35 to be destroyed, for example by burning. The devices 29 and 34 are provided with outlets 36 and 37, respectively, for discharge of liquid during the regeneration of liquid-permeable layers of the types 11 and 12 therein. Each one of these conduits is connected to the outlets 14 on the individual separation units included. Instead of using tributyl phosphate, other extraction agents can be used in the exemplified case such as other organic esters of phosphoric acid.

I claim:

1. A method comprising: separating in a liquid mixture, a liquid in a continuous phase from a liquid in the form of drops in a phase dispersed therein, by providing a apparatus including a chamber (10) having a liquid-permeable layer (11, 12) for the passage of the liquid mixture therethrough, the layer having through-holes of which at least the majority has a cross-sectional area which is greater than the cross-sectional area of at least the majority of the drops of the liquid in the dispersed phase, means for shearing said liquid mixture, including a rotor (23) arranged in the chamber on the inlet side of the liquid-permeable layer for maintaining a film (24) of liquid, movable along the layer, from the dispersed phase on the layer, and means for maintaining a higher pressure on the inlet side of the layer. than on its outlet side sufficient to cause drops of the liquid in the dispersed phase to coalesce in the firm and in the through-holes of the layer, feeding said liquid mixture to said inlet side, withdrawing continuous phase and coalesced dispersed phase from said outlet side, and separating said continuous phase depleted from the dispersed phase from said coalesced dispersed phase.

2. A method according to claim 1, characterized in that the liquid-permeable layer (11,12) comprise a supporting element (11a, 12a) with through-holes, in the holes of which and on the surface of which at least one layer of a particle material (11b, 12b) is arranged.

3. A method according to claim 1, characterized in that a flux of 1-50 $m^3/m^2h$ is maintained in the liquid-permeable layer (11, 12).

4. A method according claim 1, characterized in that a liquid flow is maintained along the liquid-permeable layer (11, 12) on the outlet side thereof and that the velocity of flow for this is at most 2 m/sec.

5. A method according to any of claim 1, characterized in the that the chamber (10) is provided with an inlet (13) and a sealable outlet for the liquid mixture on the inlet side of the liquid-permeable layer (11, 12) and with at least one outlet for the coalesced liquid and the liquid in the continuous phase on the outlet side of the layer.

6. A method according to claim 5, characterized in that the liquid in the dispersed phase consists of an extraction agent, supplied to the liquid in the continuous phase, for extraction of one or more substances dissolved in the liquid in the continuous phase.

7. A method according to claim 6, characterized in that the liquid in the dispersed phase with a dissolved substance or dissolved substances absorbed from the liquid in the continuous phase, after separation in coalesced state from the liquid in the continuous phase, is freed from the absorbed substance or substances.

* * * * *